United States Patent

Chambers

[11] Patent Number: 5,083,764
[45] Date of Patent: Jan. 28, 1992

[54] SUCTION CUP FOR CURLING A SHEET NEAR ITS EDGE AND METHOD OF USE

[75] Inventor: Robert W. Chambers, Mount Laurel, N.J.

[73] Assignee: E. I. du Pont de Nemours and Company, Wilmington, Del.

[21] Appl. No.: 552,552

[22] Filed: Jul. 16, 1990

[51] Int. Cl.$^5$ .............................................. B65H 3/08
[52] U.S. Cl. ...................................... 271/106; 271/90; 294/64.1
[58] Field of Search .................. 271/90, 106; 294/64.1

[56] References Cited

U.S. PATENT DOCUMENTS

| | | | |
|---|---|---|---|
| 696,186 | 3/1902 | Orloff | 294/64.1 |
| 3,154,306 | 10/1964 | Elliott et al. | 271/106 |
| 3,552,741 | 1/1971 | Staines | 271/106 |
| 3,901,502 | 8/1975 | Vits | 271/106 |
| 4,081,686 | 3/1978 | Nieuweboer | 250/480 |
| 4,262,896 | 4/1981 | Uchida et al. | 271/90 |
| 4,359,216 | 11/1982 | Leonard | 271/107 |
| 4,399,990 | 8/1983 | Jirusé | 271/90 |
| 4,509,736 | 4/1985 | Stahl et al. | 271/11 |
| 4,514,958 | 5/1985 | Hoorn | 53/266 R |
| 4,589,648 | 5/1986 | Hancock | 271/90 |
| 4,734,926 | 3/1988 | Singer et al. | 378/187 |
| 4,775,138 | 10/1988 | Müller | 271/9 |
| 4,887,284 | 12/1989 | Bauer et al. | 271/90 |
| 4,979,729 | 12/1990 | Bauer et al. | 294/64.1 |

FOREIGN PATENT DOCUMENTS

| | | | |
|---|---|---|---|
| 282352 | 2/1915 | Fed. Rep. of Germany | 294/64.1 |
| 2608106 | 9/1977 | Fed. Rep. of Germany | 271/90 |
| 3503622 | 11/1987 | Fed. Rep. of Germany . | |
| 3716904 | 12/1988 | Fed. Rep. of Germany . | |

*Primary Examiner*—Robert P. Olszewski
*Assistant Examiner*—Steven M. Reiss
*Attorney, Agent, or Firm*—John E. Griffiths

[57] ABSTRACT

The present invention relates to a method and apparatus for moving sheets from substrates without substantially moving the substrate and, specifically, where the sheets are sheets of X-ray film and the substrates are screens found in conventional X-ray cassettes or other sheets in a closely packed stack of sheets. The method and apparatus use at least one suction cup for curling and, thereby, lifting a portion of a sheet near an edge thereof allowing air to partially enter underneath the sheet. The suction cup has a sheet contacting face with a recess extending into the face where the recess is defined by an inner conical surface, a first planar surface and a second planar surface.

17 Claims, 9 Drawing Sheets

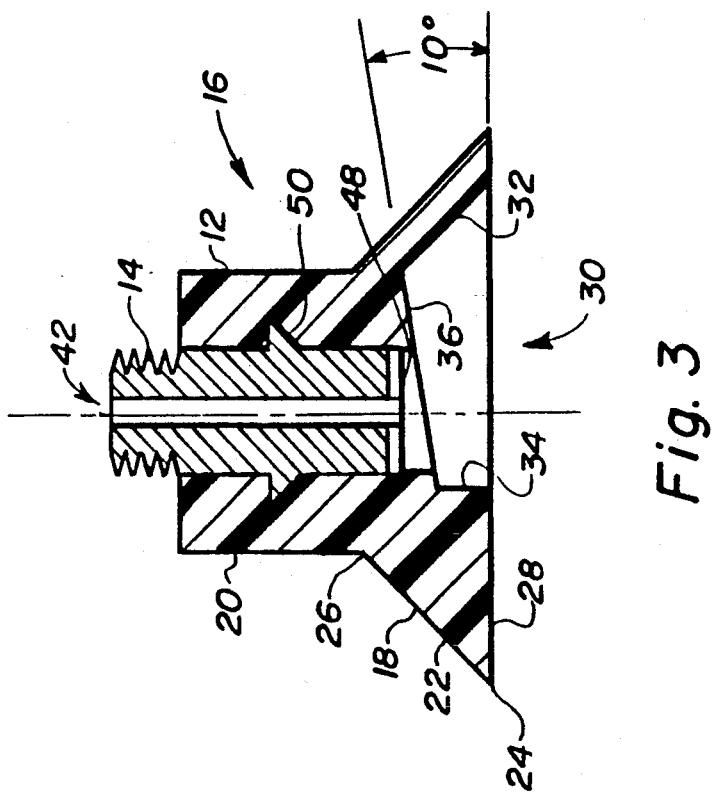
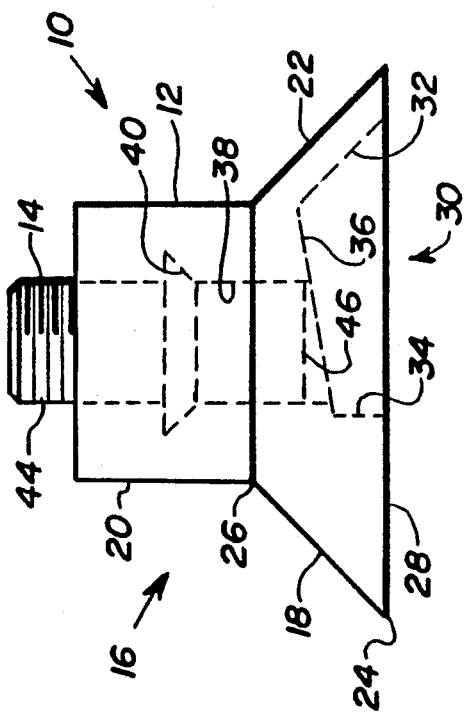
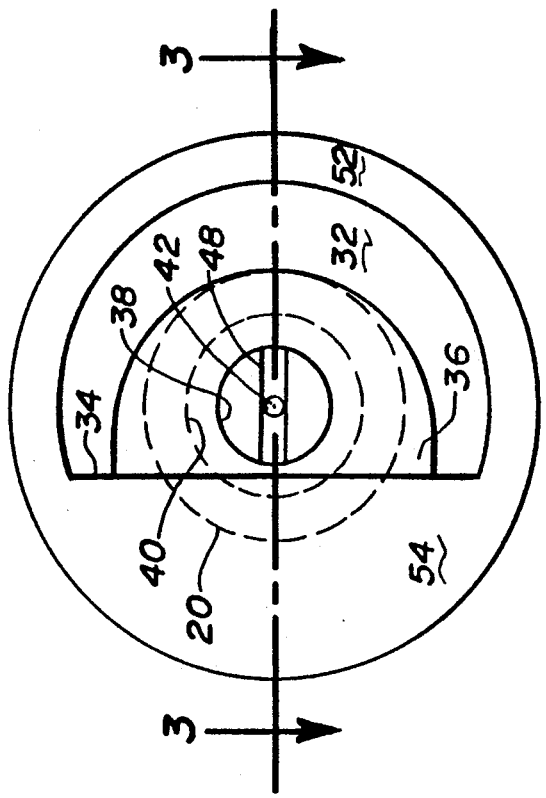

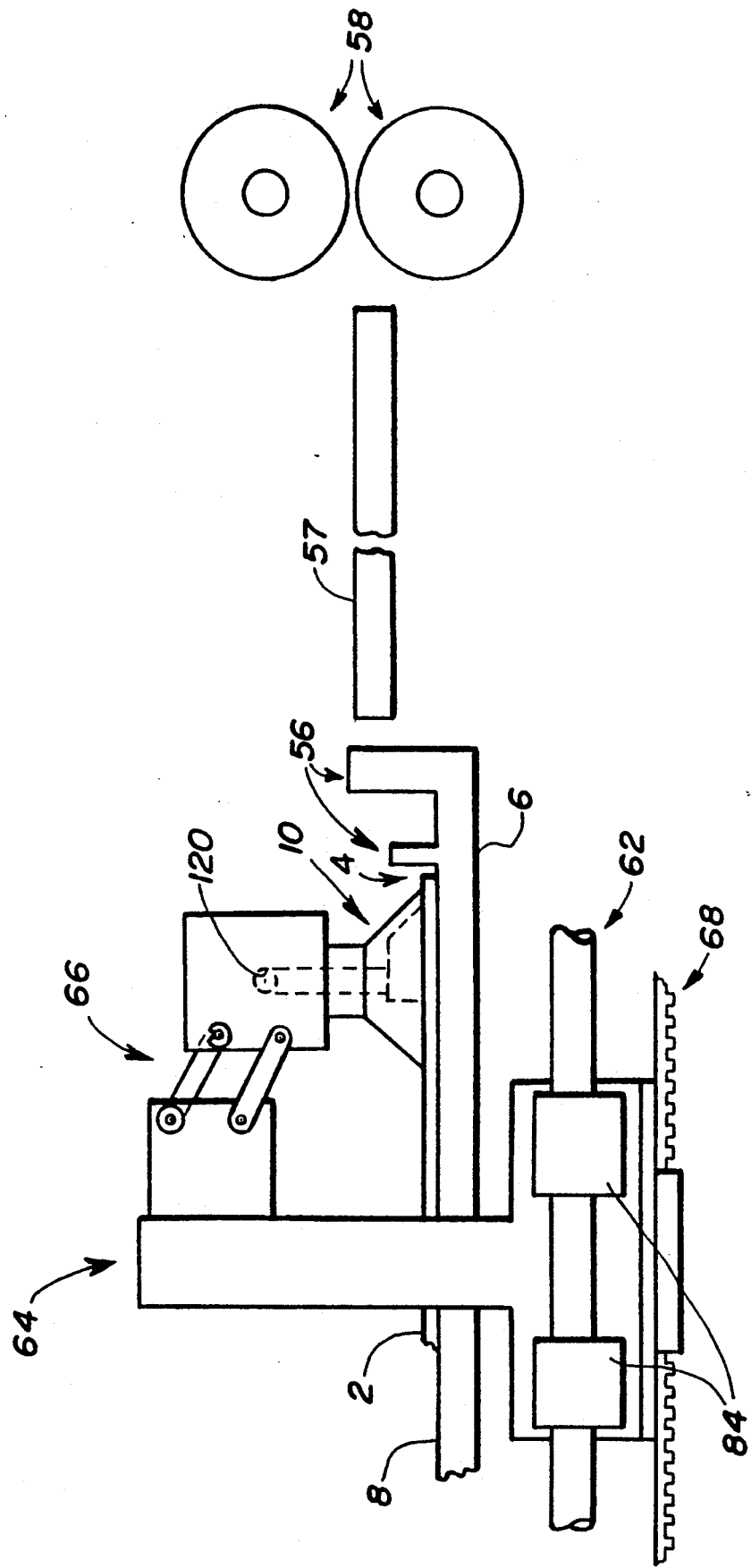

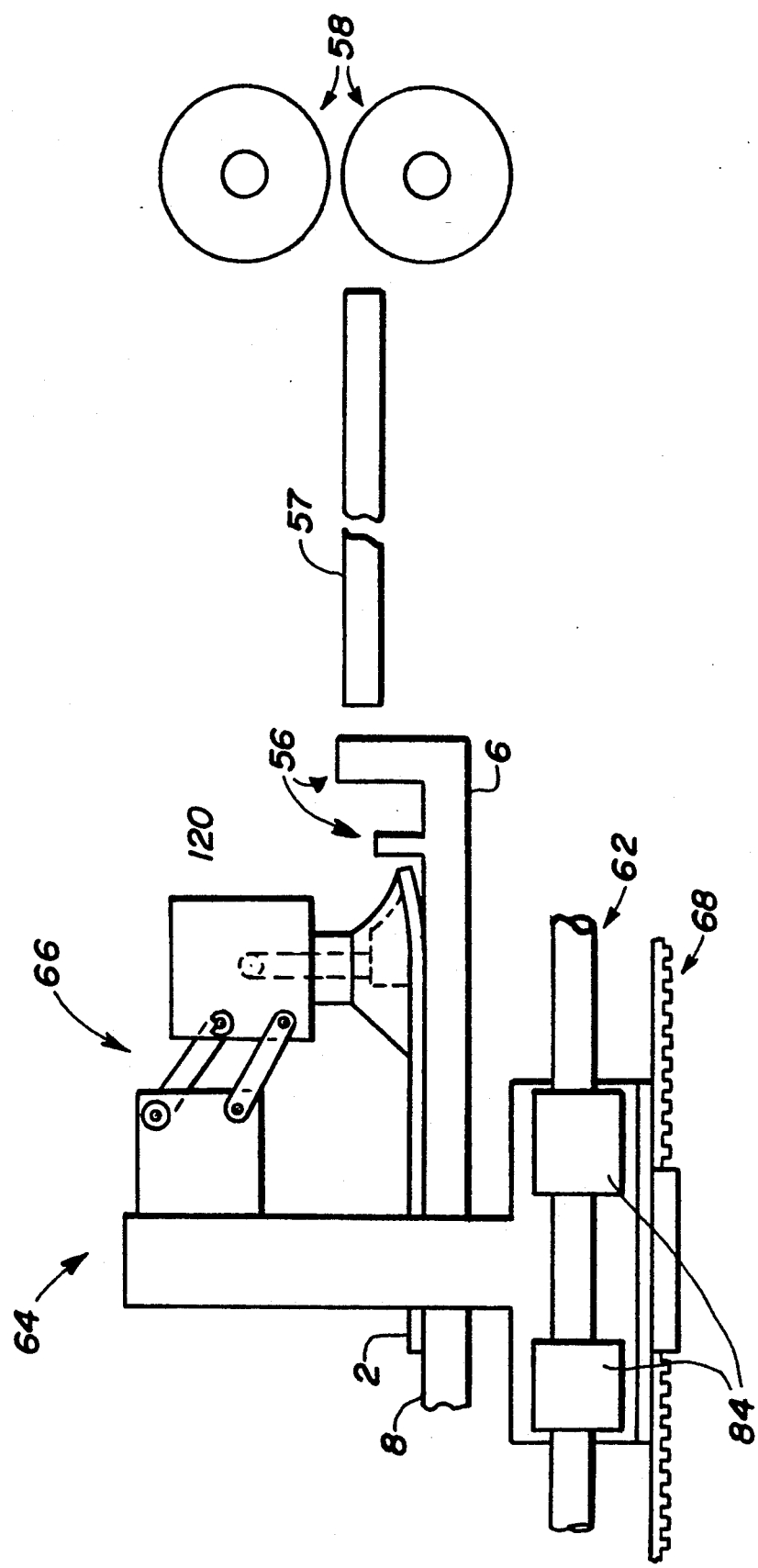

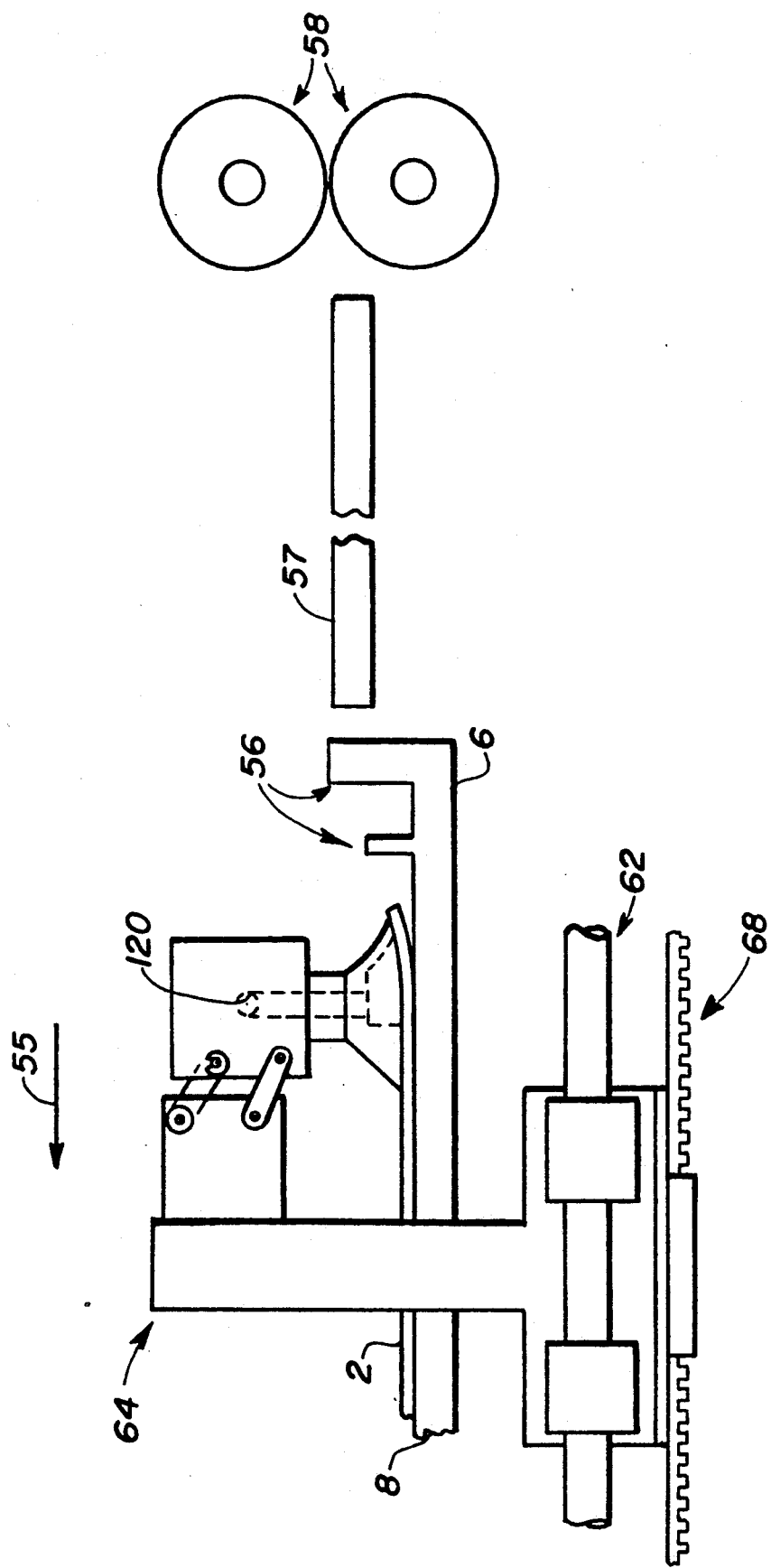

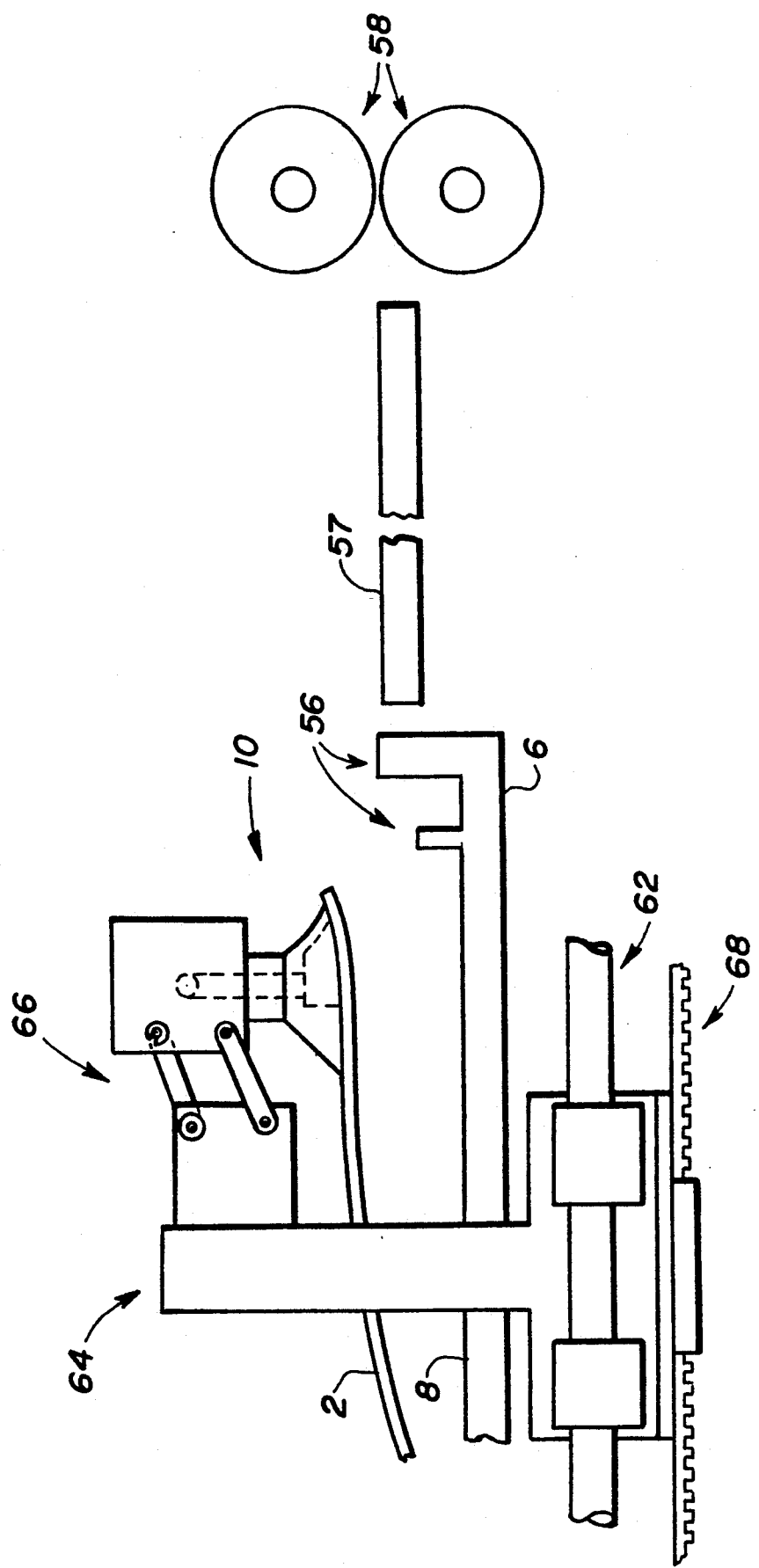

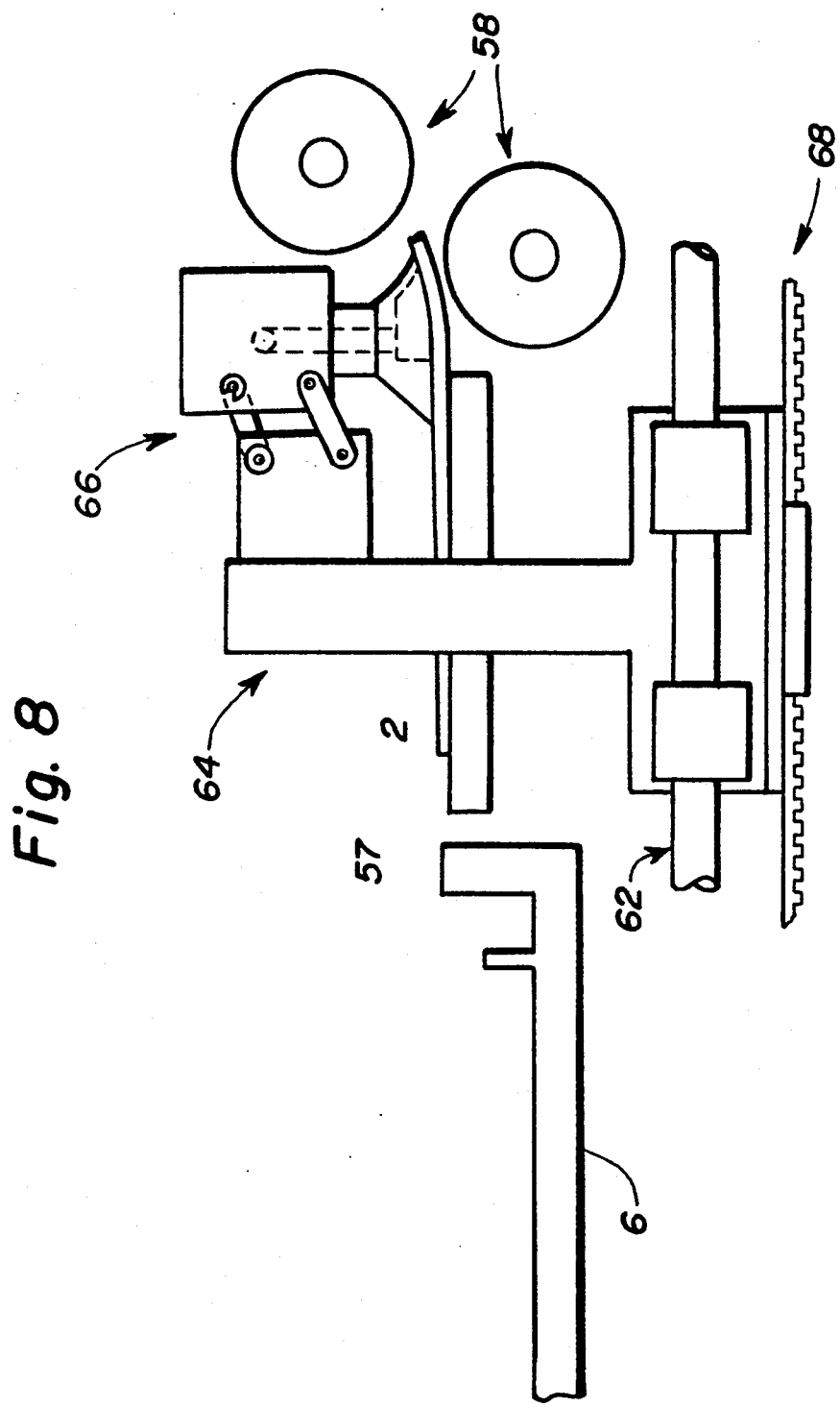

SUCTION CUP FOR CURLING A SHEET NEAR ITS EDGE AND METHOD OF USE

BACKGROUND OF THE INVENTION

1. Field of the Invention

This invention relates to a method and apparatus for moving sheets from substrates without substantially moving the substrate and, specifically, where the sheets are sheets of X-ray film and the substrates are screens found in conventional X-ray cassettes or other sheets in a closely packed stack of sheets.

2. Description of Related Art

Automatic X-ray film handling systems exist that automatically unload exposed sheets of X-ray film from light tight cassettes and reload the light tight cassettes with sheets of unexposed X-ray film, without the need for a darkroom. One such automatic X-ray film handling system is disclosed in U.S. Pat. No. 4,514,958. This system uses conventional suction cups to remove exposed X-ray film from cassettes.

X-ray cassettes are specifically designed to squeeze out air from between the film and an intensifying screen in the cassette in order to enhance radiogram quality. This lack of air between the film and the screen hinders or precludes the easy separation of the film and screen by conventional suction cups.

Due to the vacuum or adhesion between the compressed film and screen, conventional suction cups have a tendency to raise both the film and the screen together. Separation must then be accomplished by sliding the film off the screen. However, many cassettes have obstructions or walls that prevent sliding the film off the screen. An X-ray film cassette is disclosed in U.S. Pat. No. 4,081,686 having a frame which obstructs sliding the film off its screen. This requires the use of special, non-standard, cassettes, such as disclosed in U.S. Pat. No. 4,734,926, in many automatic X-ray film handling systems.

It is an object of this invention to provide a suction cup for raising or curling a portion of a sheet near an edge of the sheet allowing air to enter between the film and the substrate or sheet beneath the sheet desired to be moved.

It is another object of this invention to provide a method and apparatus for separating sheets, such as, of X-ray film, from substrates, such as screens found in conventional X-ray cassettes or other sheets in a closely packed stack of sheets, to break the vacuum between the sheet and substrate and enable the sheet to be removed from the cassette in an acceptable period of time.

SUMMARY OF THE INVENTION

The present invention is directed to a suction cup for curling a portion of a sheet near an edge of the sheet comprising:

a body having a conical portion connected to a neck portion;

the conical portion having an outer conical surface having a first end and second end, the first end connected to a sheet contact face, the second end connected to the neck portion;

the face having a recess extending within the conical portion, the recess defined by an inner conical surface, a surface substantially normal to the sheet contact face and a surface that is inclined with respect to the normal surface and spaced from the contact face; and the conical portion and the neck portion defining a bore extending from the recess through the neck portion.

The present invention is further directed to an apparatus for moving a sheet of material comprising:

a carrier;

means for transporting the carrier;

at least one suction cup moveably mounted on the carrier, the cup comprising:

a body having a conical portion connected to a neck portion;

the conical portion having an outer conical surface having a first end and second end, the first end connected to a sheet contact face, the second end connected to the neck portion;

the face having a recess extending within the conical portion, the recess defined by an inner conical surface, a surface substantially normal to the contact face and a surface that is inclined with respect to the normal surface and spaced from the contact face; and the conical portion and the neck portion defining a bore extending from the recess through the neck portion; and means for moving the suction cup.

The invention is further directed to a process for moving a sheet of a material having an edge comprising:

placing at least one suction cup near the edge of the sheet, wherein the suction cup comprises:

a body having a conical portion connected to a neck portion;

the conical portion having an outer conical surface having a first end and second end, the first end connected to a sheet contact face, the second end connected to the neck portion;

the face having a recess extending within the conical portion, the recess defined by an inner conical surface, a surface substantially normal to the surface contact face and a surface that is inclined with respect to the normal surface and spaced from the contact face; and the conical portion and the neck portion defining a bore extending from the recess through the neck portion;

applying a vacuum through the suction cup, curling a portion of the sheet near the edge allowing air to partially enter underneath the sheet; and transporting the at least one suction cup to move the sheet to a new location.

BRIEF DESCRIPTION OF THE DRAWINGS

The invention can be more fully understood from the following detailed description thereof in connection with accompanying drawings which form a part of this application and in which:

FIG. 1 is a side view of a suction cup assembly in accordance with the present invention.

FIG. 2 is a bottom view of the suction cup assembly of FIG. 1.

FIG. 3 is a sectional view through the suction cup assembly taken on the line 3—3 of FIG. 2 in the direction of the arrows.

FIG. 4 is a schematic representation illustrating a step of placing the suction cup assembly on a sheet of material in an open light tight X ray cassette in accordance with the present invention.

FIG. 5 is a schematic representation illustrating a step of applying a vacuum through the suction cup assembly curling a leading portion of the sheet in accordance with the present invention.

FIG. 6 is a schematic representation illustrating a step of transporting the suction cup assembly from an obstruction in accordance with the present invention.

FIG. 7 is a schematic representation illustrating a step of raising the suction cup assembly, thereby lifting the sheet in accordance with the present invention.

FIG. 8 is a schematic representation illustrating a step of transporting the suction cup assembly to pull the sheet to a new location in accordance with the present invention.

DESCRIPTION OF THE PREFERRED EMBODIMENT(S)

Figure 9:
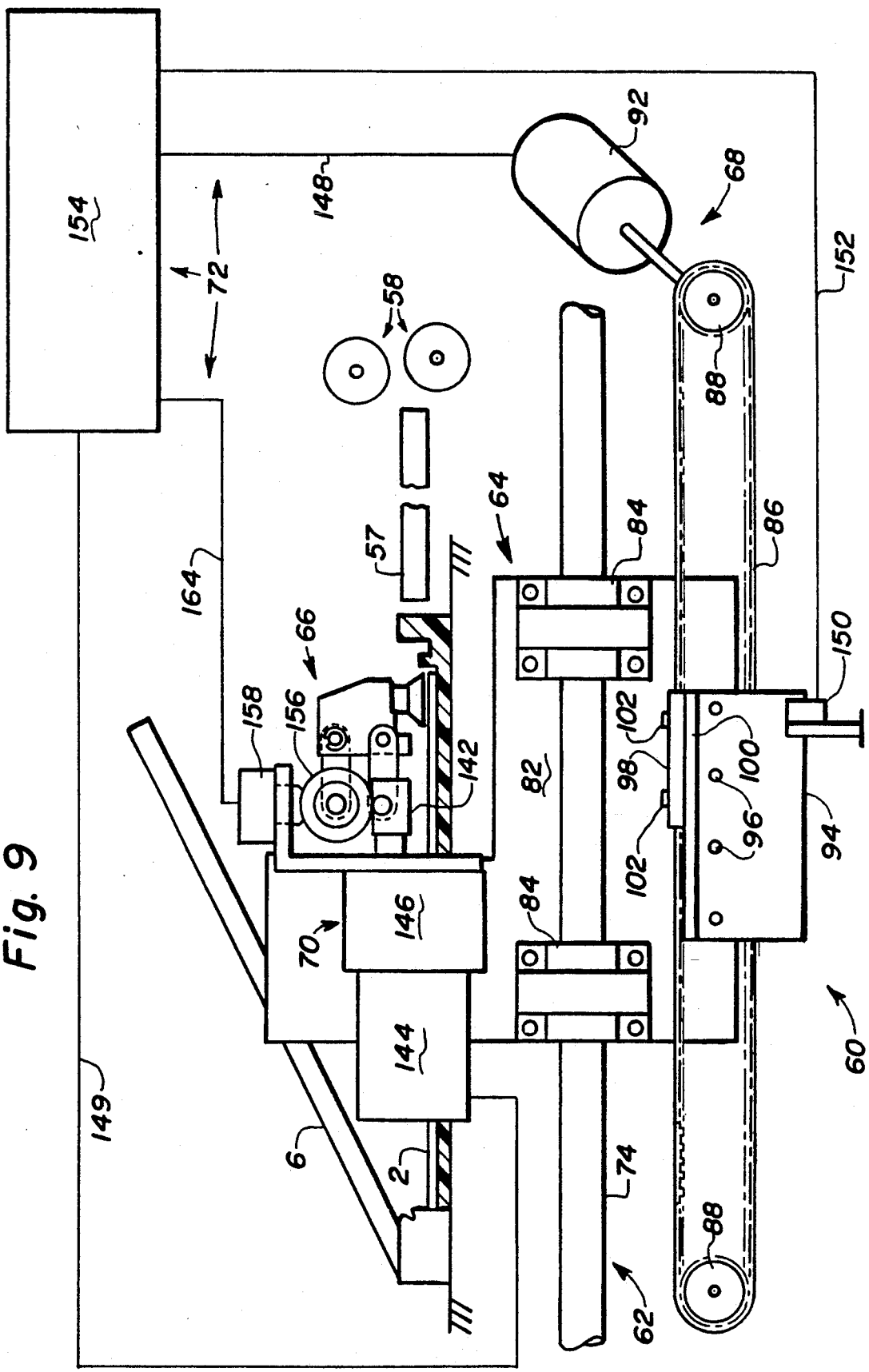
FIG. 9 is a schematic representation of a side view of apparatus for moving a sheet of material of in accordance with the present invention illustrating a mechanism for moving the suction cup assembly.

Throughout the following detailed description, similar reference characters refer to similar elements in all figures of the drawings.

Referring to FIG. 1, there is illustrated a side view of a suction cup assembly 10 in accordance with the present invention. FIG. 2 is a bottom view of the suction cup assembly of FIG. 1. FIG. 3 is a sectional view through the suction cup assembly taken on the line 3—3 of FIG. 2 in the direction of the arrows. The suction cup assembly 10 comprises a suction cup 12 and a fitting 14.

The suction cup 12 comprises a body 16 having a conical portion 18 connected to a neck portion 20. The body 16 comprises an elastomeric material. Preferably, the elastomeric material is polyurethane to reduce marks on the sheet. The conical portion 18 has an outer conical surface 22 having a first end 24 and second end 26. The first end 24 is connected to a sheet contact face 28. The second end 26 is connected to the neck portion 20. Preferably, both the outer conical surface 22 and the neck portion 20 are symmetric about a longitudinal axis.

The sheet contact face 28 has a recess 30 extending within the conical portion 18. The recess 30 is defined by an inner conical surface 32, a surface 34 substantially normal to the sheet contact face 28 and a surface 36 that is inclined with respect to the normal surface 34 and spaced from the contact face 28. The normal surface 34 and the inclined surface 36 are substantially flat. The inclined surface 36 is closest to the contact face 28 where the inclined surface 36 intersects the normal surface 34 and progressively gets farther from the contact face 28 farther from the normal surface 34. The inclined surface 36 is also preferably inclined about or exactly 10 degrees with respect to the contact face 28.

The sheet contact face 28 can be described as being a pair of lips where the lips comprise a thin lip 52 and a thicker lip 54. The thin lip 52 is ring shaped and connects the outer conical surface 22 and the inner conical surface 32 for more than half the circumference of the outer conical surface 22 and the inner conical surface 32. The thicker lip 54 is defined by and connects the first end 24 of the outer conical surface 22 and the normal surface 34. Preferably, the sheet contact face 28 is substantially flat. Thus, when the contact face 28 is in contact with a sheet 2 and a vacuum is created in the recess 30 by applying a suction through the bore 38, the thin lip 52 collapses or flexes up in FIGS. 1 and 3 generally towards the neck portion 12 raising the sheet 2 immediately under the thin lip 52 from the substrate or next sheet 8 of material under the sheet 2 being lifted. At the same time, the thicker lip 54 holds the sheet 2 immediately under it down on the substrate or next sheet 8 of material under the sheet 2 being lifted.

The conical portion 18 and the neck portion 20 define a bore 38 extending from the recess 30 through the neck portion 20. The bore 38 includes an annular recess 40.

The fitting 14 extends into the bore 38. The fitting 14 has a bore 42 extending through it for providing suction to the recess 30. The fitting 14 has a first end 44 and a second end 46. The fitting first end 44 is a threaded end for connection to a vacuum source. The fitting second end 46 has a slot 48 for connection to a screwdriver and for use in connecting the cup assembly 10 to the vacuum source. The fitting 14 has an annular projection or shoulder 50 for placement in the annular recess 40 in the bore 38 of the body 16.

In operation, the sheet contact face 28 of at least one suction cup 12 is placed in contact with a sheet 2 near an edge 4 of the sheet 2. FIG. 4 is a schematic representation illustrating the step of placing the suction cup assembly 10 on a sheet 2 of material in an opened light tight X-ray cassette 6 in accordance with the present invention.

Next, appropriate suction is applied through the bore 38 of the suction cup 12, specifically through the bore 42 of the fitting 14 in the bore 38. This curls a portion of the sheet 2 near the edge 4, allowing air to partially enter underneath the sheet 2 and separating the sheet 2 from another sheet of closely stacked material or a substrate 8. FIG. 5 is a schematic representation illustrating the step of applying a vacuum through the suction cup assembly 10 curling a leading portion of the sheet 2 away from a rigid substrate 8 in accordance with the present invention.

Preferably, the sheet 2 is raised by the suction cup assembly 10 prior to a step of transporting the sheet towards the new desired location, thereby lifting the sheet 2 to reduce frictional forces between the sheet 2 and the other sheets or substrate 8. FIG. 7 is a schematic representation illustrating the step of raising the suction cup assembly 10, thereby lifting the sheet 2 in accordance with the present invention.

If an obstruction 56 is close to the starting position of the sheet 2 which may hinder moving the sheet 2 directly to a desired location, the suction cup assembly 10 can be transported away from the obstruction 56 and the desired location before the raising step. FIG. 6 is a schematic representation illustrating the step of transporting the suction cup assembly 10 away from the obstruction 56 in the direction of arrow 55 in accordance with the present invention. In FIG. 6, the obstruction 56 is a wall of a light tight X-ray film cassette, such as disclosed in U.S. Pat. No. 4,081,686. In which case, the sheet 2 comprises exposed X-ray film.

Then the suction cup assembly 10 is transported to move the sheet to a new desired location. FIG. 8 is a schematic representation illustrating the step of transporting the suction cup assembly 10 to pull the sheet 2 over a support surface 57 to the new location in accordance with the present invention. In FIG. 8, the new location comprises a nip position between two feed rollers 58.

FIG. 9 is a schematic representation of a side view of apparatus 60 for moving or transporting a sheet 2 of material in accordance with the present invention. The apparatus 60 comprises a support 62, a carrier 64 linearly slidable on the support 62, a mechanism 68 for transporting the carrier 64, at least one of the suction cup assemblies 10, a linkage assembly 66 connecting the cup assembly 10 to the carrier 64 such that the cup assembly 10 can be raised and lowered with respect to the carrier 64, and a mechanism 70 for moving the suction cup assembly 10 with respect to the carrier 64. Further, the apparatus 60 can be automatically operated by a control system 72.

Figure 10:
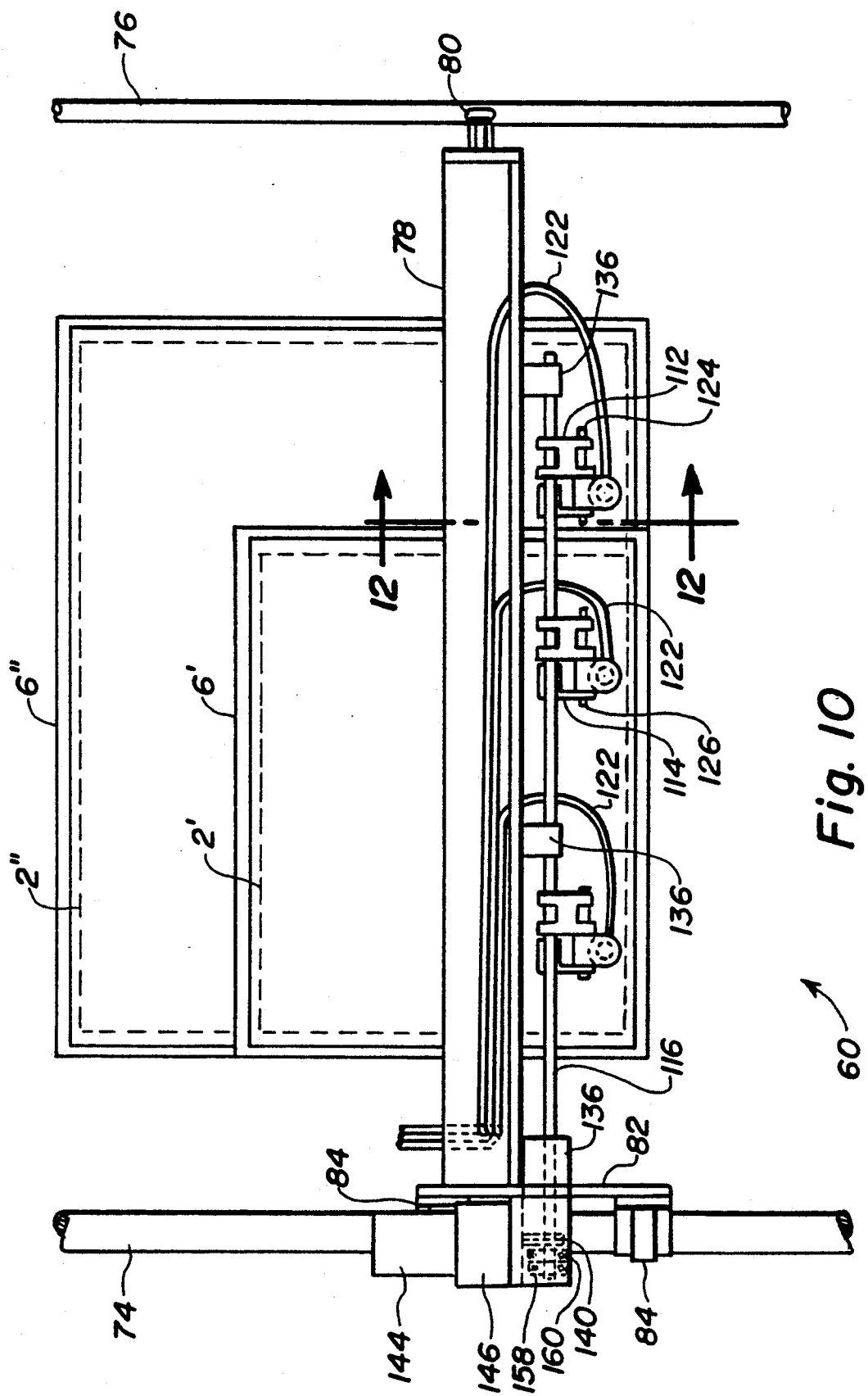
FIG. 10 is a simplified top view of the apparatus of FIG. 9 illustrating the use of a plurality of the suction cup assemblies.

FIG. 10 is a simplified top view of the apparatus 60 of FIG. 9 illustrating the use of a plurality of the suction cup assemblies 10. Specifically, FIG. 10 depicts the apparatus 60 having three suction cup assemblies 10. However, the apparatus can have one or any number more of the suction cup assemblies 10. The wider the sheet 2 the more suction cup assemblies 10 that may be necessary to remove the sheet from another sheet of closely stacked material or the substrate 8. FIG. 10 depicts the position of a first sheet 2' in a first cassette 6' that would only require the use of two of the three suction cup assemblies 10 on the apparatus 60. FIG. 10 further depicts the position of a second sheet 2" in a second cassette 6" that would require the use of all three of the suction cup assemblies 10 on the apparatus 60.

Referring to FIGS. 9 and 10, the support 62 can comprise a first stationary shaft 74 and a second stationary shaft 76, the first stationary shaft 74 being parallel to and spaced-apart from the second stationary shaft 76.

The carrier 64 may comprise a base 78 generally perpendicular to and extending between the first and second shafts 74 and 76, respectively. A pair of rollers 80 are rotatably mounted on one end of the base 78. A first one of the rollers 80 rides on top of the second shaft 76. The second roller (not depicted) rolls on the bottom of the second shaft 76 under the first top roller 80. A first plate 82 is connected to another end of the base 78. A pair of bearing assemblies 84 are mounted to the first plate 82. The first shaft 74 extends through the bearing assemblies 84.

The carrier transporting mechanism 68 may comprise a drive belt or chain 86 connected to pulleys or gears 88, one of which is on the shaft 90 of a motor 92. The drive belt 86 is connected to the plate 82 by any means. The embodiment illustrated in FIG. 9 shows a second plate 94 connected to the first plate 82 by bolts 96 and a third plate 98 connected to a horizontal extension 100 of the second plate 94 by bolts 102. The drive belt 86 is sandwiched or held between the third plate 98 and the second plate extension 100.

Figure 12:
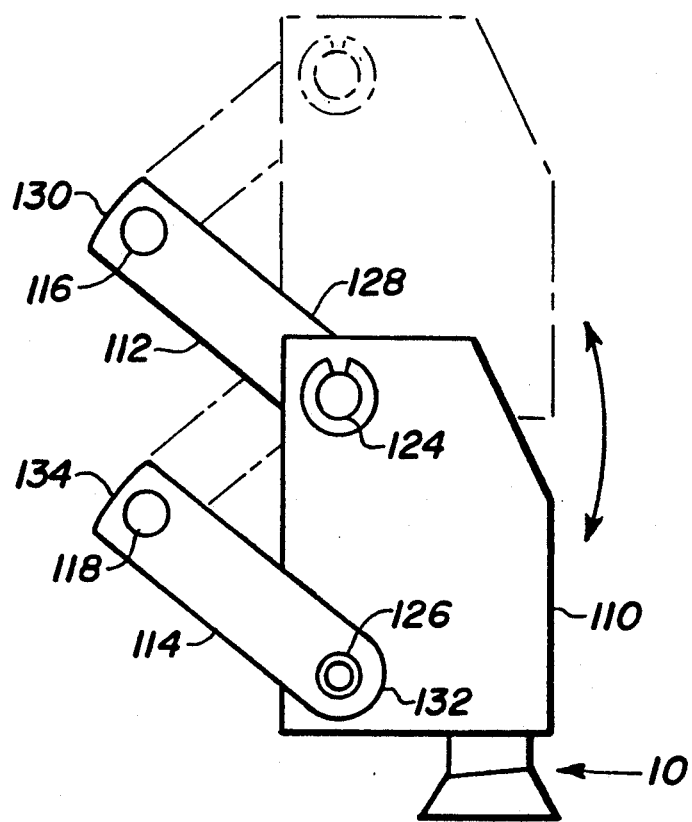
FIG. 12 is a simplified side view a linkage support attached to one of the suction cup assemblies taken on the line 12—12 of FIG. 10 in the direction of the arrows.

Referring to FIG. 12, the linkage assembly 66 may comprise a first member 110, a second member 112, a third member 114, a fourth member 116 and a fifth member 118. The first member 110 is a block having a threaded socket connectable to the threaded portion 44 of the fitting 14. A passage 120 (see FIGS. 4–6) extends from the fitting bore 42 through the block 110 to a conduit 122 connected between the block 110 and a vacuum source (not depicted). The first member 110 is rotatably connected to a first shaft 124 and fixed to a second shaft 126. The second member 112 is a link having a first end 128 and a second end 130. The first end 128 is rotatably connected to the first shaft 124. The second end 130 is connected to the fourth member 116. The third member 114 is a link having a first end 132 and a second end 134. The first end 132 is rotatably connected to the second shaft 126. The second end 134 is rotatably connected to the fifth member 118. The fourth member 116 is a shaft supported by bearing assemblies 136 mounted on the base 78. The fifth member 118 is also supported by the base 78. FIG. 12 is a simplified side view the linkage assembly 66 attached to one of the suction cup assemblies 10 taken on the line 12—12 of FIG. 10 in the direction of the arrows.

The mechanism 70 for moving the suction cup assembly 10 with respect to the carrier 64 may comprise a worm gear 140 on the fourth member 116. The worm gear 140 mates with another worm gear 142 attached to a shaft driven by a motor 144 or by gears in a gear box 146 driven by the motor 144.

The control system 72 may connect the carrier drive motor 92 to a computer system 154, such as, by a line 148. The control system 72 may connect the suction cup assembly motor 144 to the computer system 154, such as, by a line 149. The control system 72 may connect to and control the operation of the vacuum source (not depicted). The control system 72 may include a carrier position sensor 150 connected schematically by a line 152 to a computer system 154. The control system 72 may also include a shaft position code drum 156 fixed on the fourth member 116 with a second sensor 158 and a third sensor 160 positioned, such as, above and adjacent an outer surface 162 of the drum 156. The second sensor 158 and the third sensor 160 can be connected by lines 164 to the computer system 154, such as, schematically illustrated in FIG. 9. The first, second and third sensors 150, 158, 160 can be adapted to emit a radiation or light beam towards an object in order to sense and generate an electrical signal representative of reflections of the beam back from the object.

Figure 11:
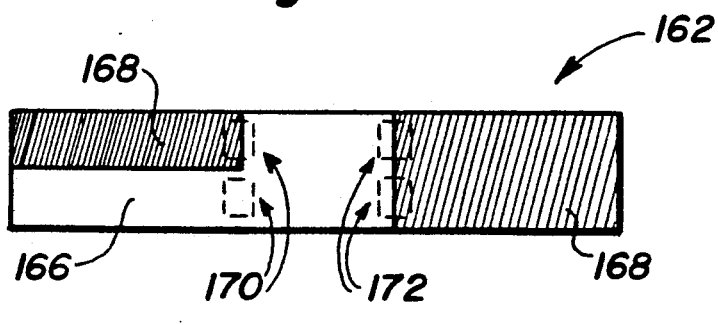
FIG. 11 illustrates a surface of a shaft position code drum shown in a flat orientation.

FIG. 11 illustrates an embodiment of the outer surface 162 of the shaft position code drum 156 shown in a flat orientation. The surface 162 has a reflective area 66 and a non-reflective area 168. The dashed boxes designated by the number 170 in FIG. 11 represent the position of the second sensor 158 and the third sensor 160 with respect to the drum surface 162 when the cups 12 are in a "cups up" or home position. The suction cup assembly 10 is illustrated in the "cups up" or home position in phantom lines in FIG. 12. In this position, either the second sensor 158 or the third sensor 160 receives a return (i.e., a reflection) from the reflective area 166 on the drum surface 162. This return signal can be designated a digital one (1). At the same time, the other one of the sensors does not receive a return (i.e., a reflection) from the non-reflective area 168 of the drum surface 162. This return signal can be designated a digital zero (0). This combination of signals, i.e., 1—0, is, thus, designated as the "cups up" code. The dashed boxes designated by the number 172 in FIG. 11 represent the position of the second sensor 158 and the third sensor 160 with respect to the drum surface 162 when the cups 12 are in a "cups down" position (illustrated in FIG. 4) where both the second sensor 158 and the third sensor 160 are positioned over the non-reflective area 168 of the drum surface 162. Here, both sensors 158, 160 combined produce the code 0—0. Between the "cups up" and "cups down" positions the sensors 158, 160 produce the code 1—1 where both sensors are over the reflective area 162. Thus, there are three possible codes: 1—0, 0—0 and 1—1.

When the apparatus 60 is first turned on, the drum 156 can be oriented in any position. If the sensors 158, 160 read the code 1—0, then the drum 156 could be at the "cup up" position 170 or to the left of the "cup up" position 170 in FIG. 11 with one of the sensors above the reflective area 166. However, due to the presence of the 1—0 code, the preprogrammed logic of the computer system 154 knows on which side of "cups up" position 170 that the drum 156 is located and, therefore, in which direction to rotate the cups 12, drum 156, etc., in order to arrive at the "cups up" position. Rotation continues until the signals or code from the sensors 158, 160 changes from 1—0 to 0—0. The cup drive motor 144 then reverses direction and stops when the code changes again, i.e., from 0—0 to 1—0. The cups 12 are then in their home position.

In a similar manner, the "cups down" 0—0 code tells the computer system 154 that the drum 156 is at or past the "cups down" position. The computer system 154, therefore, knows (i.e., is programmed to know) in which direction the drum 156 should be rotated to find the home position, i.e., code 1—0. If the code 1—1, indicating that the cups 12 are between the "cups up" and "cups down" positions, is received, the computer system 154 also knows in which direction the drum 156 should be rotated to find the home position. Once the home position is established, the apparatus 60 simply operates between the "cups up" and "cups down" position back and forth across the reflective area 166 of the surface 162.

The computer system 154 may include commercially available motor control assemblies, a computer and other electrical components (such as, amplifiers, analog to digital converters, digital to analog converters, etc.) to connect the motors 92, 144 and sensors 150, 158, 160 to the computer.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A suction cup for curling a portion of a sheet near an edge of the sheet away from a planar sheet support, comprising:
   a body having a conical portion connected to a neck portion;
   the conical portion having an outer conical surface having a first end and second end, the first end connected to a sheet contact face, the second end connected to the neck portion;
   the face having a recess extending within the conical portion, the recess defined by an inner conical surface, a first planar surface intersecting and substantially normal to the sheet contact face and a second planar surface that intersects and is inclined with respect to the normal surface and spaced from the contact face; and
   the conical portion and the neck portion defining a bore extending from the recess through the neck portion.

2. The suction cup of claim 1, wherein when the sheet contact face is in contact with the sheet near the edge and appropriate suction is applied through the bore the cup may be used to curl a portion of the sheet near the edge and separate the sheet from another sheet of closely stacked material or a substrate.

3. The suction cup of claim 1, wherein the body comprises an elastomeric material.

4. The suction cup of claim 3, wherein the elastomeric material is a polyurethane to reduce marks on the sheet.

5. The suction cup of claim 1, wherein the bore includes an annular recess.

6. The suction cup of claim 5, further comprising:
   a fitting for insertion into the bore;
   the fitting having a bore extending through it for providing suction to the recess;
   the fitting having a first end and a second end, the first end being a threaded end for connection to a vacuum source and the second end having a slot for connection to a screwdriver and for use in connecting the cup to the vacuum source; and
   the fitting having an annular shoulder for placement in the annular recess in the bore of the body.

7. The suction cup of claim 1, wherein the normal surface and the inclined surface are substantially flat.

8. The suction cup of claim 1, wherein the inclined surface is closest to the contact face where the inclined surface intersects the normal surface and progressively gets farther from the contact face farther from the normal surface.

9. An apparatus for moving a sheet of of material from a planar sheet support, comprising:
   a carrier;
   means for transporting the carrier;
   at least one suction cup for curling a portion of the sheet near an edge of the sheet away from the planar sheet support, the cup moveably mounted on the carrier, the cup comprising:
      a body having a conical portion connected to a neck portion;
      the conical portion having an outer conical surface having a first end and second end, the first end connected to a sheet contact face, the second end connected to the neck portion;
      the face having a recess extending within the conical portion, the recess defined by an inner conical surface, a first planar surface intersecting and substantially normal to the contact face and a second planar surface that intersects and is inclined with respect to the normal surface and spaced from the contact face; and
      the conical portion and the neck portion defining a bore extending from the recess through the neck portion; and
   means for moving the suction cup.

10. The apparatus of claim 9, wherein there are three of the suction cups.

11. A process for moving a sheet of a material having an edge comprising:
    placing at least one suction cup near the edge of the sheet on a planar sheet support, wherein the suction cup comprises:
       a body having a conical portion connected to a neck portion;
       the conical portion having an outer conical surface having a first end and second end, the first end connected to a sheet contact face, the second end connected to the neck portion;
       the face having a recess extending within the conical portion, the recess defined by an inner conical surface, a first planar surface intersecting and substantially normal to the surface contact face and a second planar surface that intersects and is inclined with respect to the normal surface and spaced from the contact face; and the conical portion and the neck portion defining a bore extending from the recess through the neck portion;

applying a vacuum through the suction cup, curling a portion of the sheet near the edge allowing air to partially enter underneath the sheet; and transporting the at least one suction cup to move the sheet to a new location.

12. The process of claim 11, wherein the sheet originates on a stack of closely packed sheets or a substrate.

13. The process of claim 11, further comprising: raising the at least one suction cup prior to the transporting step, thereby lifting the sheet to reduce frictional forces between the sheet and other sheets or a substrate.

14. The process of claim 13, further comprising: transporting the at least one suction cup from an obstruction away from the new location before the raising step.

15. The process of claim 11, further comprising: transporting the at least one suction cup from an obstruction away from the new location before transporting the suction cup to the new location.

16. The process of claim 15, wherein the obstruction is a wall of a light tight cassette.

17. The process of claim 11, wherein the sheet comprises exposed X-ray film.

* * * * *